US010953829B2

(12) United States Patent
Suzuki et al.

(10) Patent No.: US 10,953,829 B2
(45) Date of Patent: Mar. 23, 2021

(54) OCCUPANT PROTECTION DEVICE

(71) Applicant: SUBARU CORPORATION, Tokyo (JP)

(72) Inventors: Chihiro Suzuki, Tokyo (JP); Masaaki Kobayashi, Tokyo (JP); Tsuyoshi Nomura, Tokyo (JP); Noriaki Saito, Tokyo (JP); Takeru Shoji, Tokyo (JP); Keiko Sonoda, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 111 days.

(21) Appl. No.: 16/373,035

(22) Filed: Apr. 2, 2019

(65) Prior Publication Data
US 2019/0329726 A1 Oct. 31, 2019

(30) Foreign Application Priority Data

Apr. 27, 2018 (JP) .............................. JP2018-086085

(51) Int. Cl.
B60R 21/0136 (2006.01)
B60R 22/24 (2006.01)
(Continued)

(52) U.S. Cl.
CPC .......... B60R 21/0136 (2013.01); B60R 22/24 (2013.01); B60R 2021/0006 (2013.01); B60R 2021/01272 (2013.01)

(58) Field of Classification Search
CPC .................................................. B60R 21/0136
See application file for complete search history.

(56) References Cited

U.S. PATENT DOCUMENTS 2,885,159 A 5/1959 Ashwood
4,492,340 A 1/1985 Fieldus
(Continued)

FOREIGN PATENT DOCUMENTS

CN 107734824 A 2/2018
DE 2144818 A1 3/1973
(Continued)

OTHER PUBLICATIONS

Machine translation JP2004148968, May 27, 2004.*
(Continued)

Primary Examiner — Anne Marie Antonucci
Assistant Examiner — Abdalla A Khaled
(74) Attorney, Agent, or Firm — McDermott Will & Emery LLP

(57) ABSTRACT

An occupant protection device including a seat belt that includes a shoulder belt and a lap belt, a locking tongue that is capable of switching between an unlock state and a lock state, a shoulder-belt puller that is capable of pulling the shoulder belt, a lap-belt puller that is capable of pulling the lap belt, a side-collision detector that detects a side collision or a precursor thereof, and a control unit that changes a state of the locking tongue into the lock state and a state of the lap-belt puller into a first pulling state in which the lap-belt puller pulls the lap belt and that subsequently changes a state of the shoulder-belt puller into a second pulling state in which the shoulder-belt puller pulls the shoulder belt when the side-collision detector detects the side collision that occurs opposite an occupant or the precursor thereof.

17 Claims, 11 Drawing Sheets

(51) Int. Cl.
B60R 21/00 (2006.01)
B60R 21/01 (2006.01)

(56) References Cited

U.S. PATENT DOCUMENTS

| | | |
|---|---|---|
| 5,552,986 A | 9/1996 | Omura et al. |
| 8,453,457 B2 | 6/2013 | Ginn et al. |
| 8,887,484 B2 | 11/2014 | Warsop |
| 2010/0224733 A1 | 9/2010 | Wood et al. |
| 2010/0244541 A1 | 9/2010 | Dennis et al. |
| 2011/0120980 A1 | 5/2011 | Corke et al. |
| 2012/0248072 A1 | 10/2012 | McClure et al. |
| 2017/0087962 A1 | 3/2017 | Tamura et al. |

FOREIGN PATENT DOCUMENTS

| | | |
|---|---|---|
| DE | 2643391 B3 | 9/2009 |
| DE | 10 2016 218092 A1 | 3/2017 |
| JP | 06-286581 A | 10/1994 |
| JP | 10-152019 A | 6/1998 |
| JP | 2004-148968 A | 5/2004 |
| JP | 2005-138757 A | 6/2005 |
| JP | 2007-022428 A | 2/2007 |
| JP | 2008-012966 A | 1/2008 |
| JP | 2008-049718 A | 3/2008 |
| JP | 2008-207764 A | 9/2008 |
| JP | 2008-293925 A | 12/2008 |
| JP | 2009-511360 A | 3/2009 |
| JP | 2010-241415 A | 10/2010 |
| JP | 2011-201412 A | 10/2011 |
| JP | 2013-018460 A | 1/2013 |
| JP | 2017-100550 A | 6/2017 |
| JP | 2017-124680 A | 7/2017 |
| WO | 96/20867 A1 | 7/1996 |

OTHER PUBLICATIONS

Machine translation JPH10152019, Jun. 9, 1998.*
Machine translation JP2005138757, Jun. 2, 2005.*
Machine translation JP2013018460, Jan. 31, 2013.*
Machine translation JP2007022428, Feb. 1, 2007.*
Japanese Notice of Reasons for Refusal issued in corresponding Japanese Patent Application No. 2018-086085, dated Oct. 28, 2019, with English translation.
Japanese Notice of Reasons for Refusal issued in corresponding Japanese Patent Application No. 2018-091205, dated Mar. 10, 2020, with English translation.
From related U.S. Appl. No. 16/372,985, the Japanese Notice of Reasons for Refusal issued in corresponding Japanese Patent Application No. 2018-086084, dated Oct. 21, 2019, with English translation.

* cited by examiner

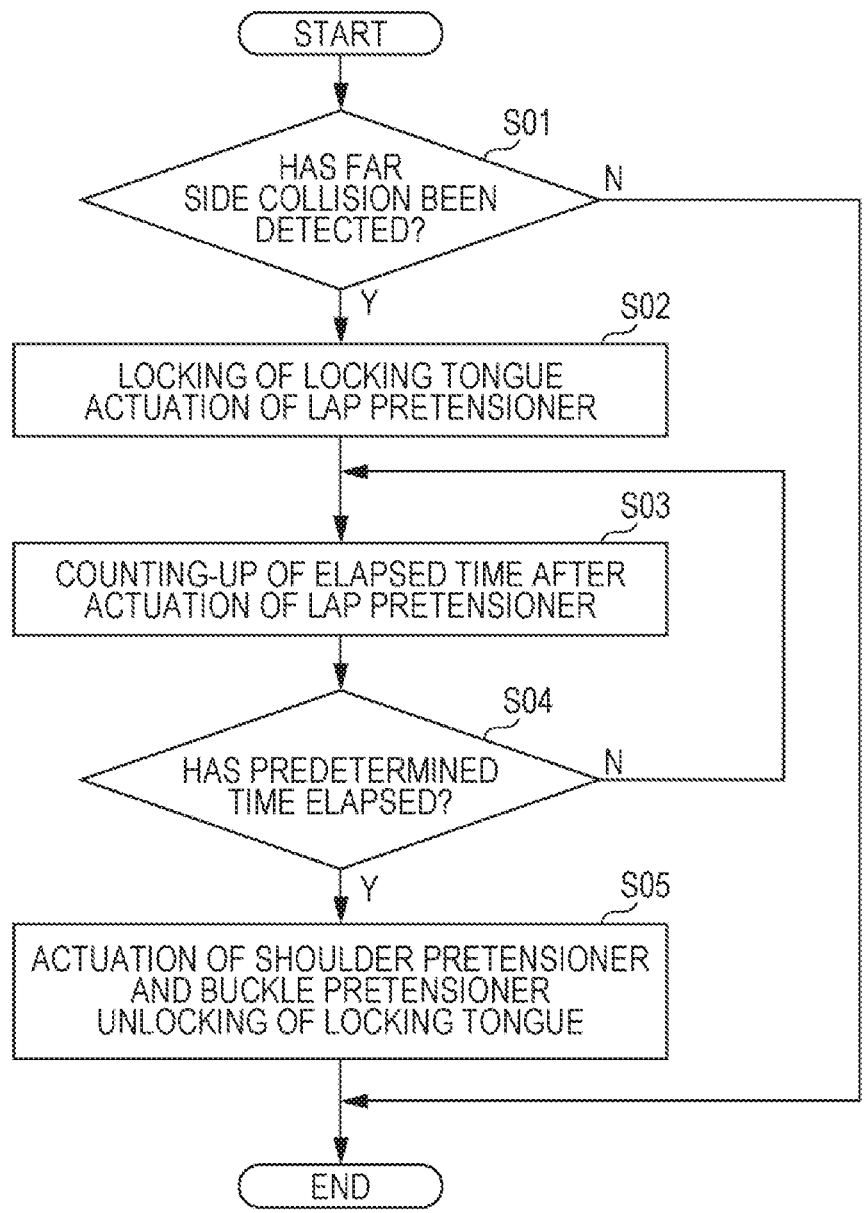

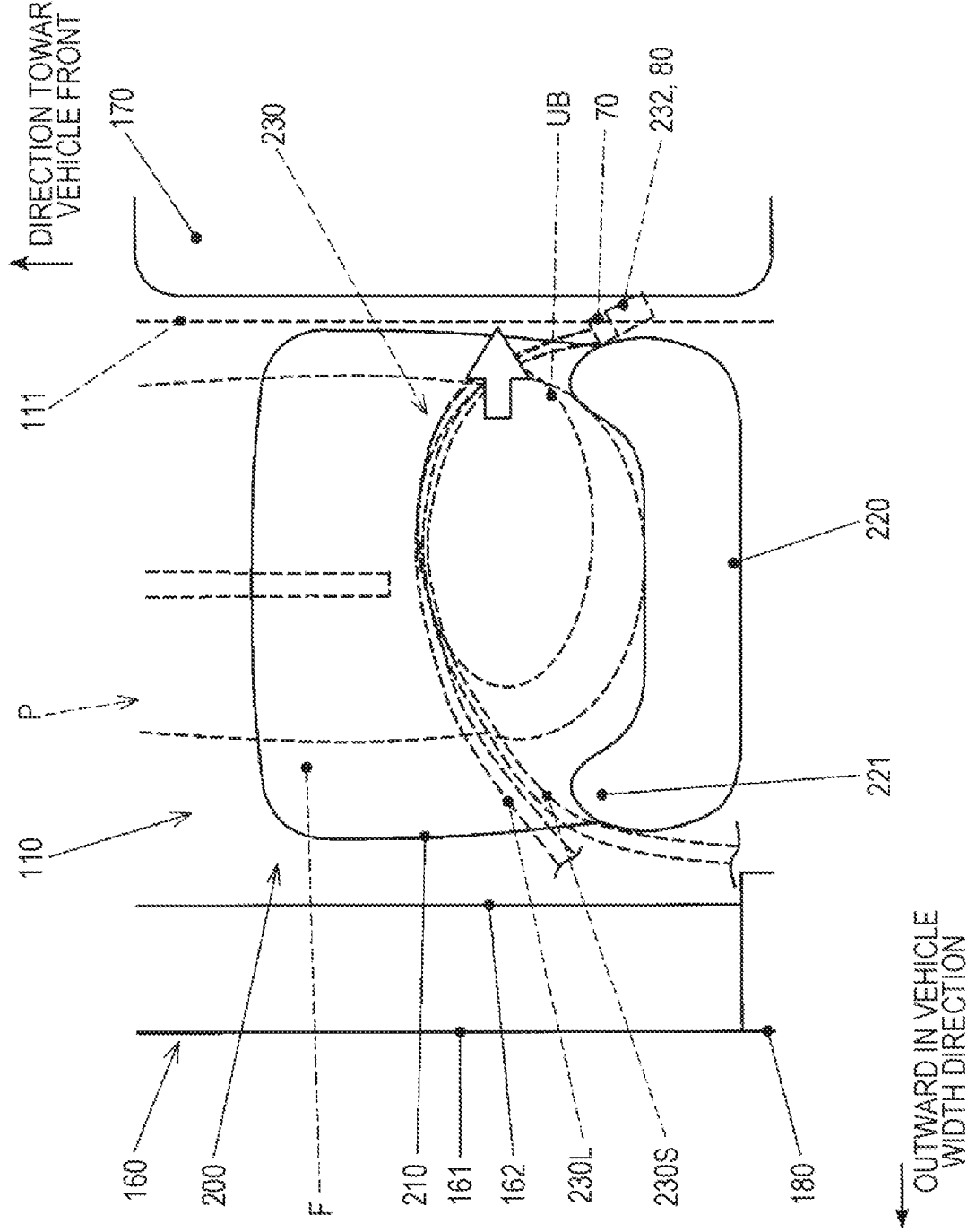

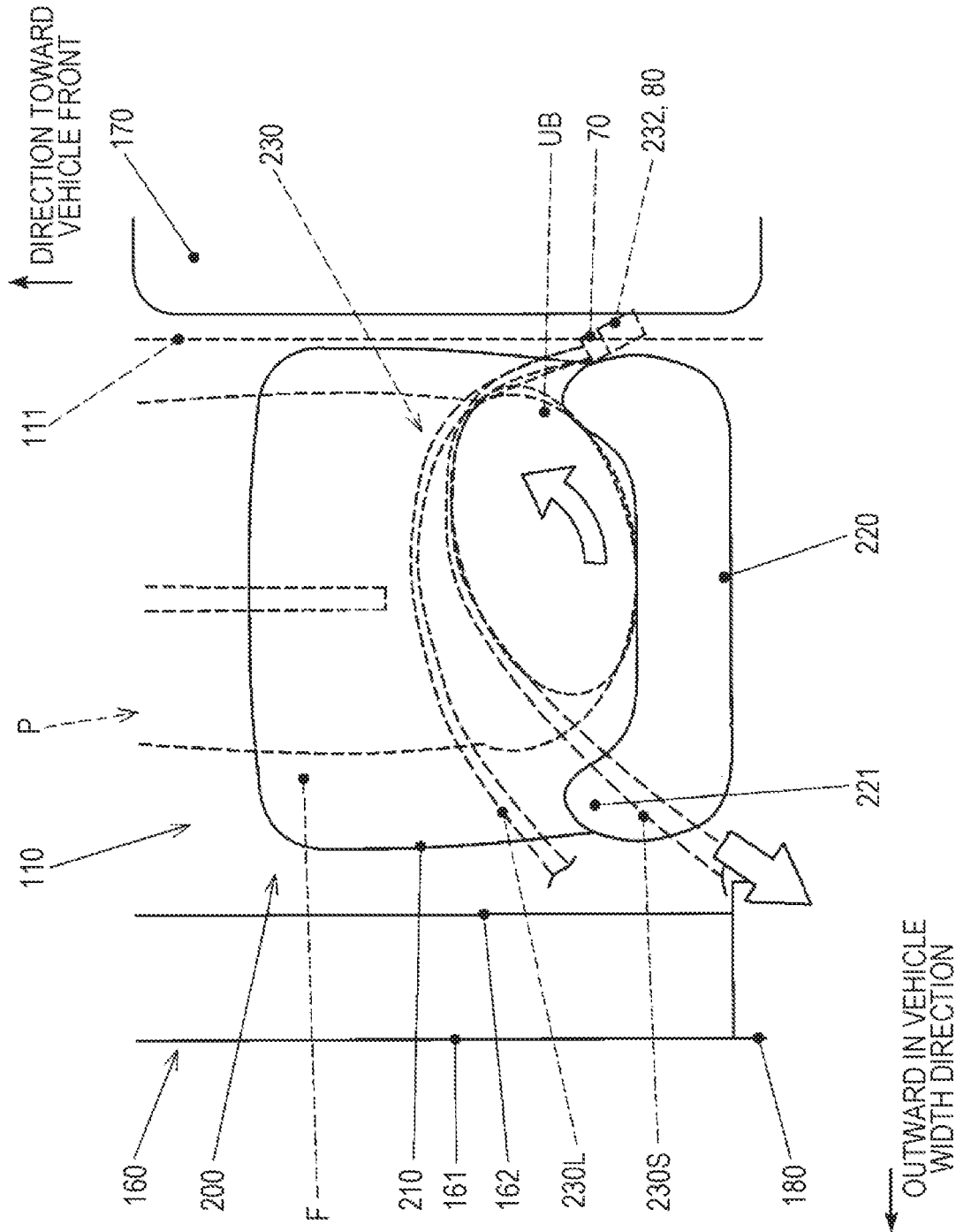

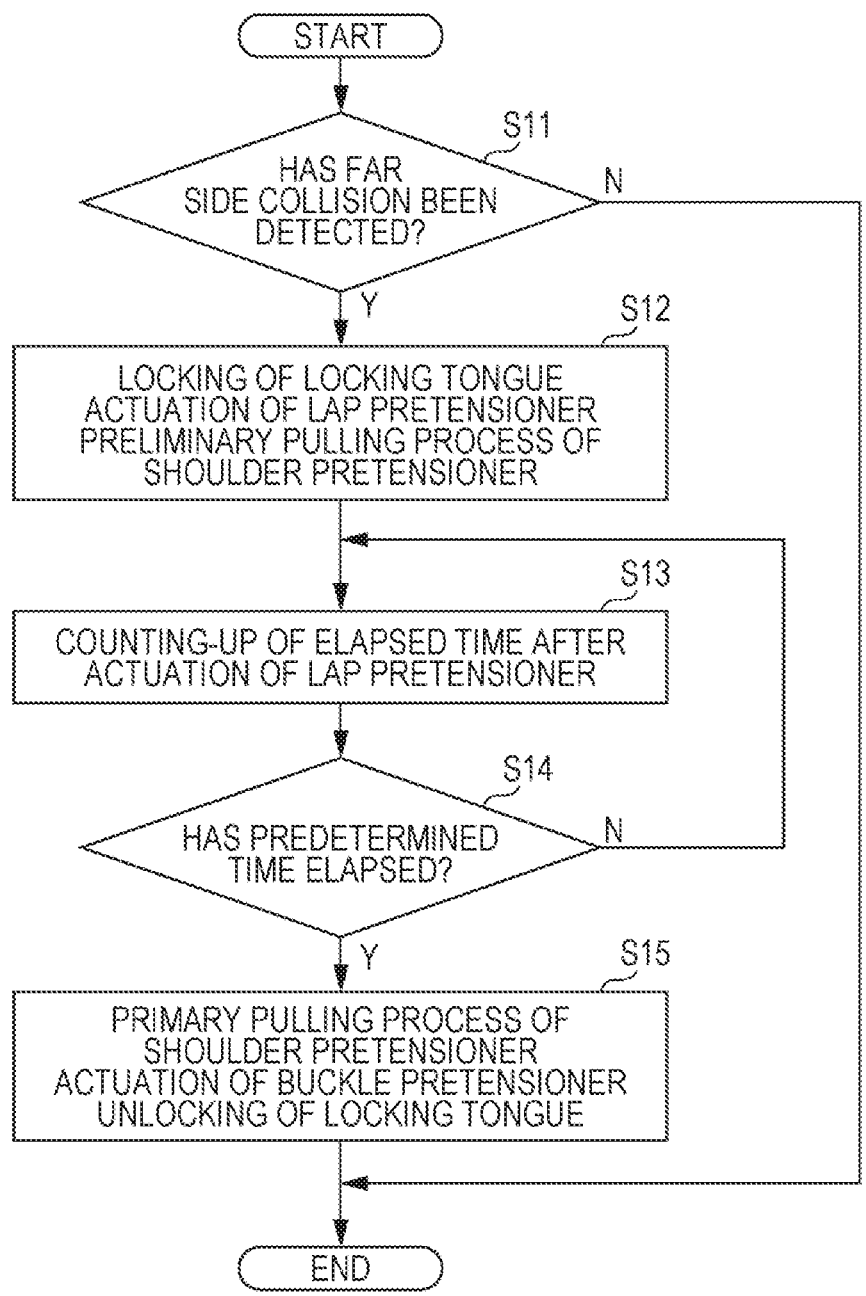

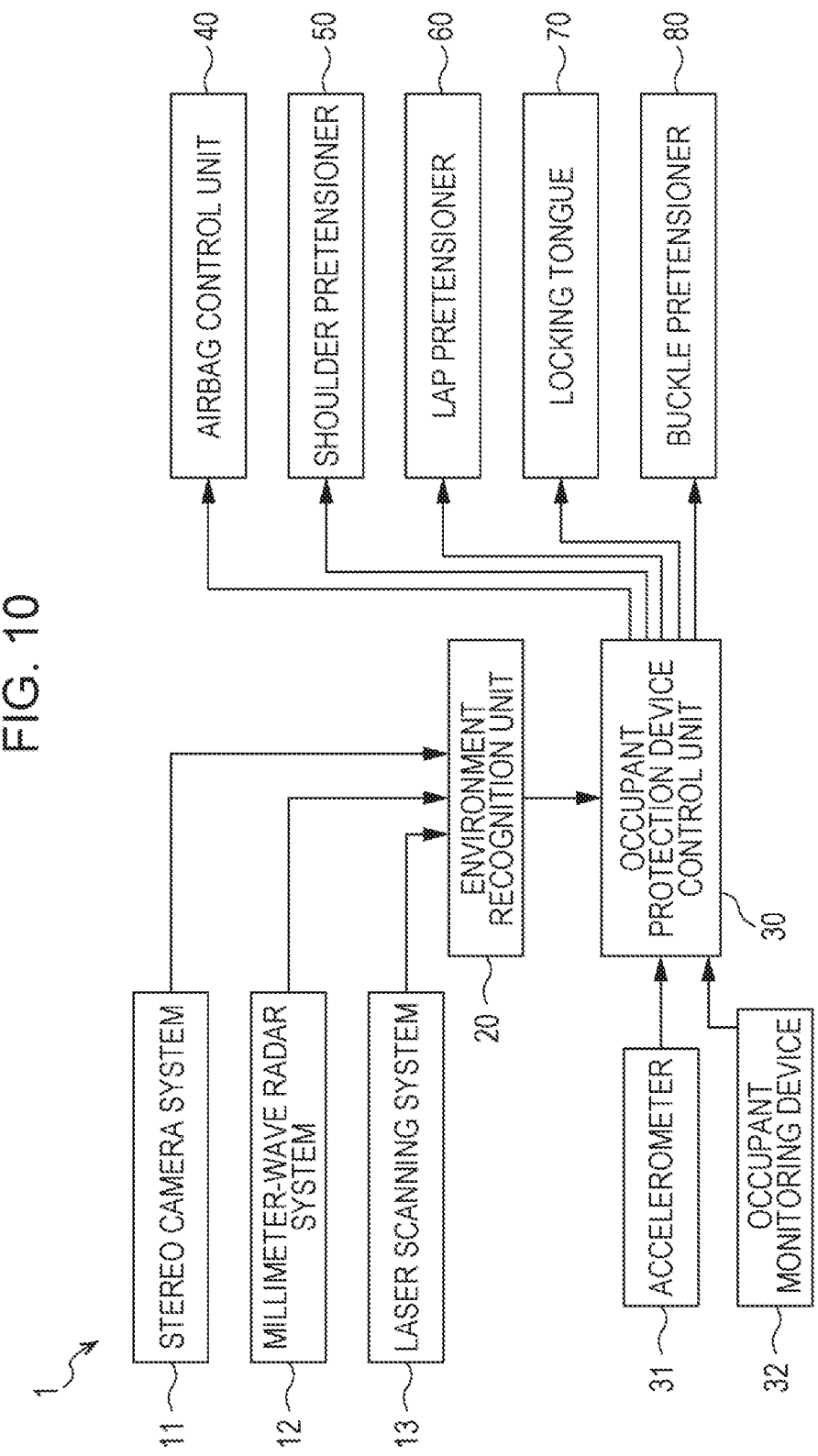

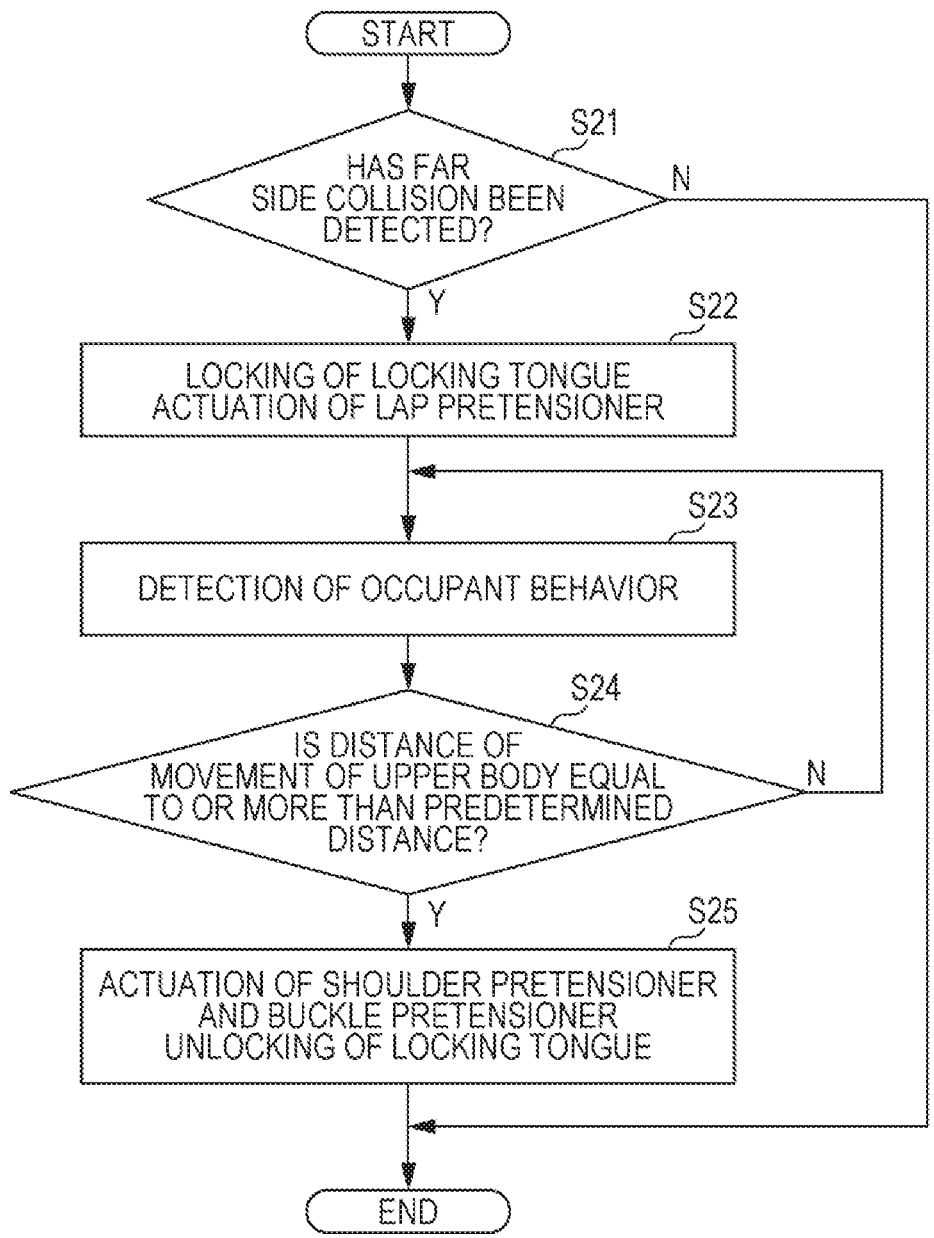

OCCUPANT PROTECTION DEVICE

CROSS-REFERENCE TO RELATED APPLICATIONS

The present application claims priority from Japanese Patent Application No. 2018-086085 filed on Apr. 27, 2018, the entire contents of which are hereby incorporated by reference.

BACKGROUND

The present disclosure relates to an occupant protection device that is disposed in a vehicle such as an automobile and that protects an occupant in a far side collision.

In vehicles such as automobiles, three-point seat belts are widely used as occupant-restraining devices that protect occupants, for example, in a collision, and each three-point seat belt includes a shoulder belt that is obliquely mounted on the upper body of an occupant and a lap belt that is mounted around the waist of the occupant.

Seat belt pretensioners are in widespread use, and each Seat belt pretensioner winds up a predetermined part of a seat belt to increase a restraining force when a collision of a vehicle or a precursor thereof is detected.

An existing technique related to a seat belt pretensioner is disclosed in, for example, Japanese Unexamined Patent Application Publication No. 2017-100550 in which an occupant-restraining device winds up a predetermined part of a webbing of a seat belt when a head-on collision or a side collision of a vehicle is detected and moves a headrest toward the front of the vehicle when it is detected that the posture of an occupant who sits on a seat shifts forward from the regular posture.

SUMMARY

An aspect of the disclosure provides an occupant protection device including a seat belt, a locking tongue, a shoulder-belt puller, a lap-belt puller, a side-collision detector, and a control unit. The seat belt includes a shoulder belt that is configured to be stretched between a vicinity of an outer shoulder part of an occupant in a vehicle width direction and a vicinity of an inner waist part of the occupant in the vehicle width direction and a lap belt that is configured to be stretched between the vicinity of the inner waist part of the occupant in the vehicle width direction and a vicinity of an outer waist part of the occupant in the vehicle width direction when the occupant sits on a seat offsetting in a left or right direction from a center of a vehicle body. The locking tongue is configured to be detachably joined to a buckle to be near the inner waist part of the occupant in the vehicle width direction, allows the seat belt to pass therethrough, and is capable of switching between an unlock state in which the seat belt is allowed to move with the locking tongue being between the shoulder belt and the lap belt and a lock state in which movement thereof is restricted. The shoulder-belt puller is capable of pulling the shoulder belt to apply a tensile force thereto, a lap-belt puller that is capable of pulling the lap belt to apply a tensile force thereto. The side-collision detector is configured to detect a side collision or a precursor thereof. The control unit is configured to change a state of the locking tongue into the lock state and a state of the lap-belt puller into a first pulling state in which the lap-belt puller pulls the lap belt. The control unit is configured to subsequently change a state of the shoulder-belt puller into a second pulling state in which the shoulder-belt puller pulls the shoulder belt when the side-collision detector detects the side collision that occurs opposite the occupant or the precursor thereof.

An aspect of the disclosure provides an occupant protection device including a seat belt, a locking tongue, a shoulder-belt puller, a side-collision detector, and a control unit. The seat belt includes a shoulder belt that is configured to be stretched between a vicinity of an outer shoulder part of an occupant in a vehicle width direction and a vicinity of an inner waist part of the occupant in the vehicle width direction and a lap belt that is configured to be stretched between the vicinity of the inner waist part of the occupant in the vehicle width direction and a vicinity of an outer waist part of the occupant in the vehicle width direction when the occupant sits on a seat offsetting in a left or right direction from a center of a vehicle body. The locking tongue is configured to be detachably joined to a buckle to be near the inner waist part of the occupant in the vehicle width direction, that allows the seat belt to pass therethrough. The locking tongue is capable of switching between an unlock state in which the seat belt is allowed to move with the locking tongue being between the shoulder belt and the lap belt and a lock state in which movement thereof is restricted. The shoulder-belt puller is capable of pulling the shoulder belt to apply a tensile force thereto. The lap-belt puller is capable of pulling the lap belt to apply a tensile force thereto. The side-collision detector is configured to detect a side collision or a precursor thereof. The control unit is configured to change a state of the locking tongue into the lock state and a state of the lap-belt puller and the shoulder-belt puller into a first pulling state in which the lap-belt puller pulls the lap belt and the shoulder-belt puller pulls the shoulder belt with a predetermined preliminary pulling force. The control unit is configured to subsequently changes a state of the shoulder-belt puller into a second pulling state in which the shoulder-belt puller pulls the shoulder belt with a pulling force that is more than the preliminary pulling force when the side-collision detector detects the side collision that occurs opposite the occupant or the precursor thereof.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to explain the principles of the disclosure.

FIG. 6 is a flow chart illustrating control of the occupant protection device according to the first embodiment in a far side collision;

FIG. 7 illustrates a state of the occupant protection device according to the first embodiment right before a shoulder pretensioner is actuated;

FIG. 8 illustrates a state of the occupant protection device according to the first embodiment right after the shoulder pretensioner is actuated;

FIG. 9 is a flow chart illustrating control of an occupant protection device according to a second embodiment of the disclosure in a far side collision;

FIG. 10 is a block diagram illustrating the structure of an occupant protection device according to a third embodiment of the disclosure; and FIG. 11 is a flow chart illustrating control of the occupant protection device according to the third embodiment in a far side collision.

DETAILED DESCRIPTION

Figure 1:
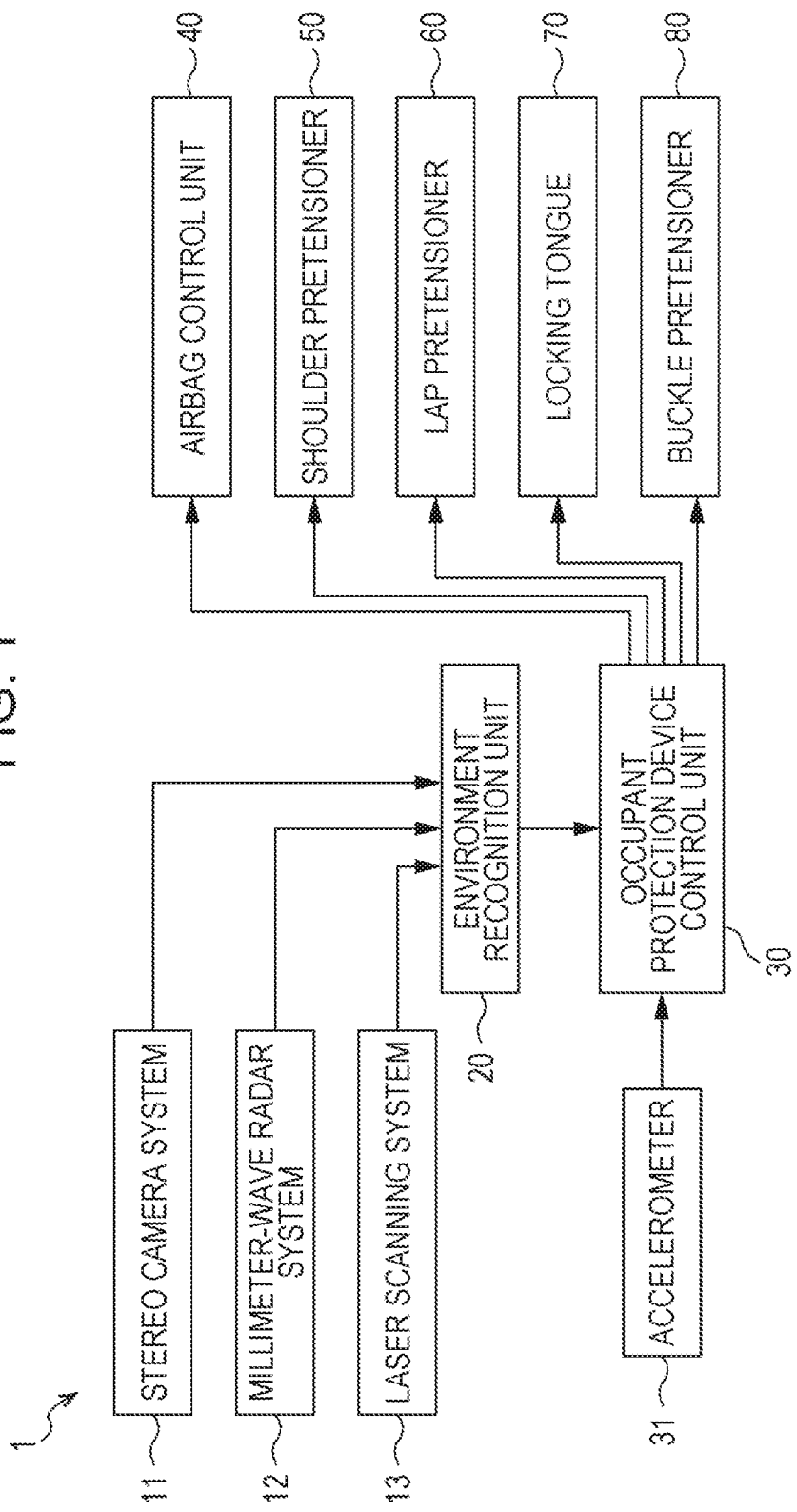
FIG. 1 is a block diagram illustrating the structure of an occupant protection device according to a first embodiment of the disclosure.

In the following, some preferred but non-limiting embodiments of the disclosure are described in detail with reference to the accompanying drawings. Note that sizes, materials, specific values, and any other factors illustrated in respective embodiments are illustrative for easier understanding of the disclosure, and are not intended to limit the scope of the disclosure unless otherwise specifically stated. Further, elements in the following example embodiments which are not recited in a most-generic independent claim of the disclosure are optional and may be provided on an as-needed basis. Throughout the present specification and the drawings, elements having substantially the same function and configuration are denoted with the same reference numerals to avoid any redundant description. Further, elements that are not directly related to the disclosure are unillustrated in the drawings. The drawings are schematic and are not intended to be drawn to scale.

In recent years, there has been a need for improved occupant protection performance in a side collision.

In particular, in the case of a far side collision that occurs opposite an occupant who sits on a seat in a vehicle width direction, it is difficult for the occupant to be protected even by various kinds of airbag systems such as a side airbag and a curtain airbag, and there is a problem in that the upper body or head of the occupant is greatly shaken by an inertial force in the direction of the far side collision of a vehicle body and collides with, for example, another occupant on a near side (near the collision) or an interior member, which results in more severe injury.

The injury of the occupant in a side collision can be reduced by restricting movement of the occupant in the vehicle width direction in a manner in which a seat belt is pulled by using a seat belt pretensioner, and the tensile force of a shoulder belt is increased to restrain the upper body and waist of the occupant on a seat in the side collision.

In this case, it is important for the waist of the occupant to be restrained in the early stage of the collision with certainty to prevent the waist from swinging such that the buttocks are raised from a seat base. For this purpose, the tensile force of a lap belt of the seat belt needs to be considerably increased.

In the case of a three-point seat belt, however, there is a concern that the chest is injured, for example, because the ribs, which are relatively more fragile than the hipbones (pelvis), bend when the tensile force of the shoulder belt that restrains the upper body of the occupant is excessively increased with an increase in the tensile force of the lap belt.

It is desirable to provide an occupant protection device that enables movement of the occupant in the vehicle width direction to be restricted in the far side collision and enables injury of the chest to be reduced.

First Embodiment

An occupant protection device according to a first embodiment of the disclosure will now be described.

The occupant protection device according to the first embodiment protects an occupant who sits on, for example, a front seat (a driver's seat or a passenger seat) of an automobile such as a car.

FIG. 1 is a block diagram illustrating the structure of the occupant protection device according to the first embodiment.

Figure 2:
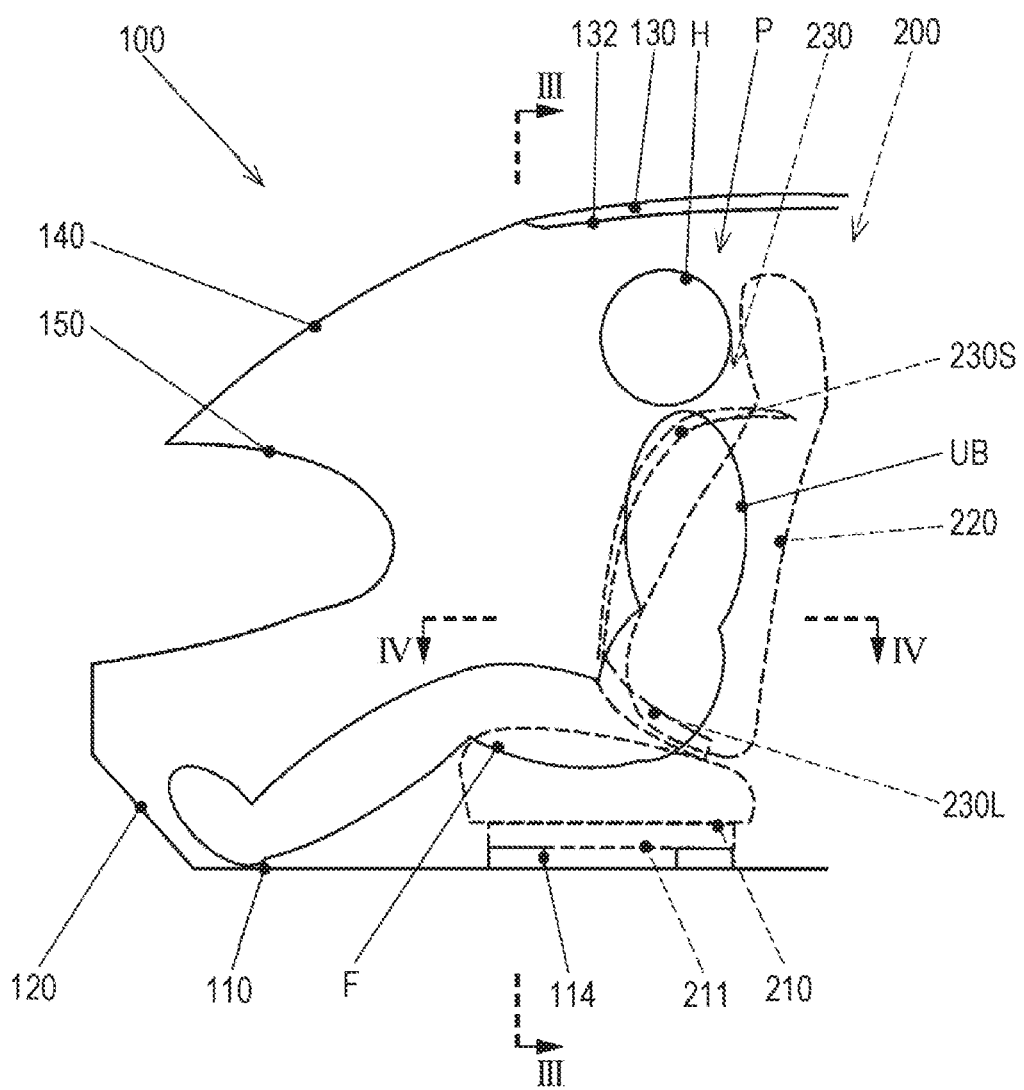
FIG. 2 schematically illustrates a normal state of the front of a vehicle cabin of a vehicle that includes the occupant protection device according to the first embodiment viewed from the side.

FIG. 2 schematically illustrates a normal state (state in which no collision or precursor thereof is detected) of the front of a vehicle cabin of a vehicle that includes the occupant protection device according to the first embodiment viewed from the side.

In FIG. 2, the left direction coincides with the direction toward a vehicle front (the same is true for FIG. 6 to FIG. 7).

Figure 3:
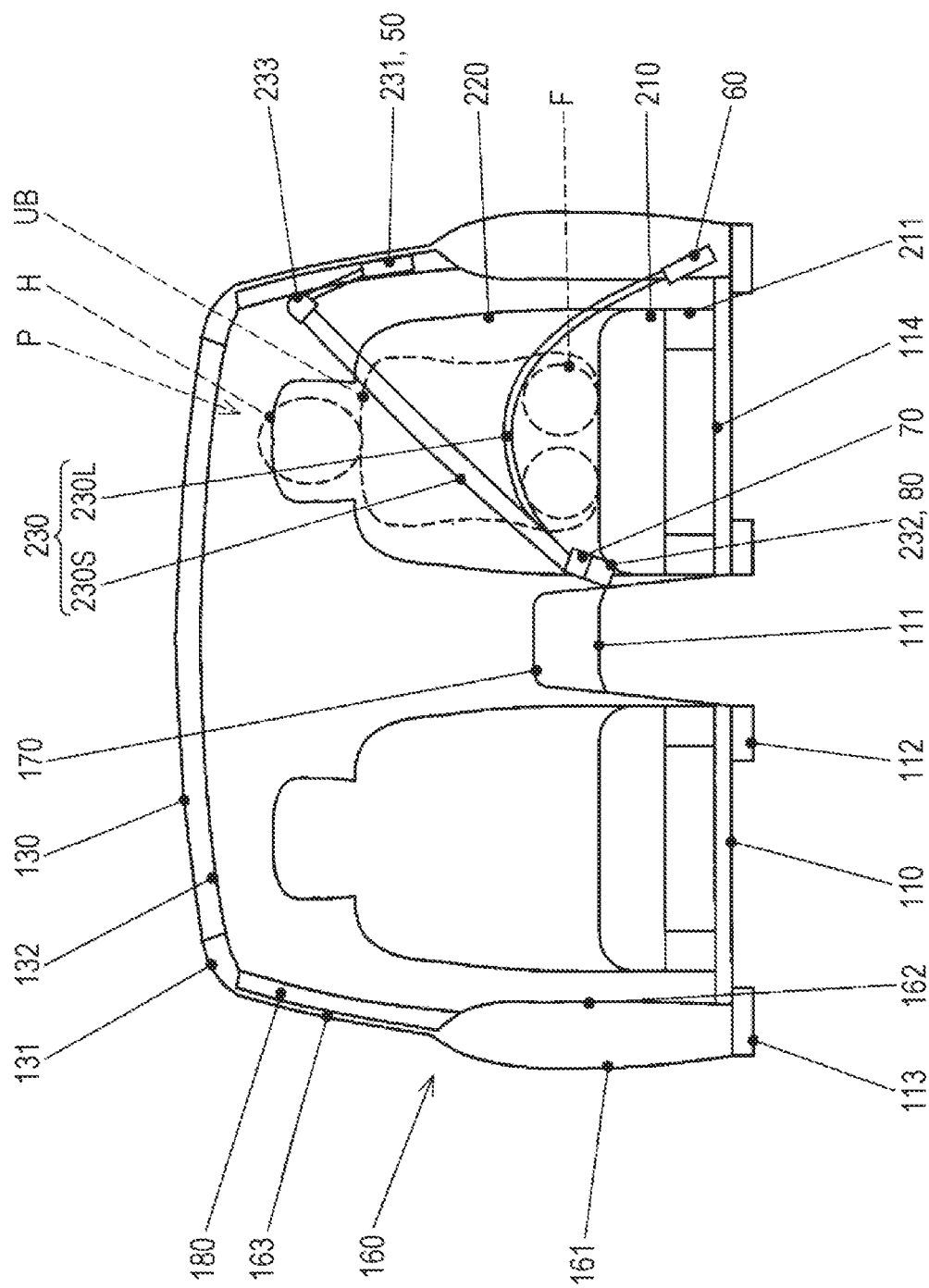
FIG. 3 is a sectional view of FIG. 2 taken along line III-III.

FIG. 3 is a sectional view of FIG. 2 taken along line III-III.

Figure 4:
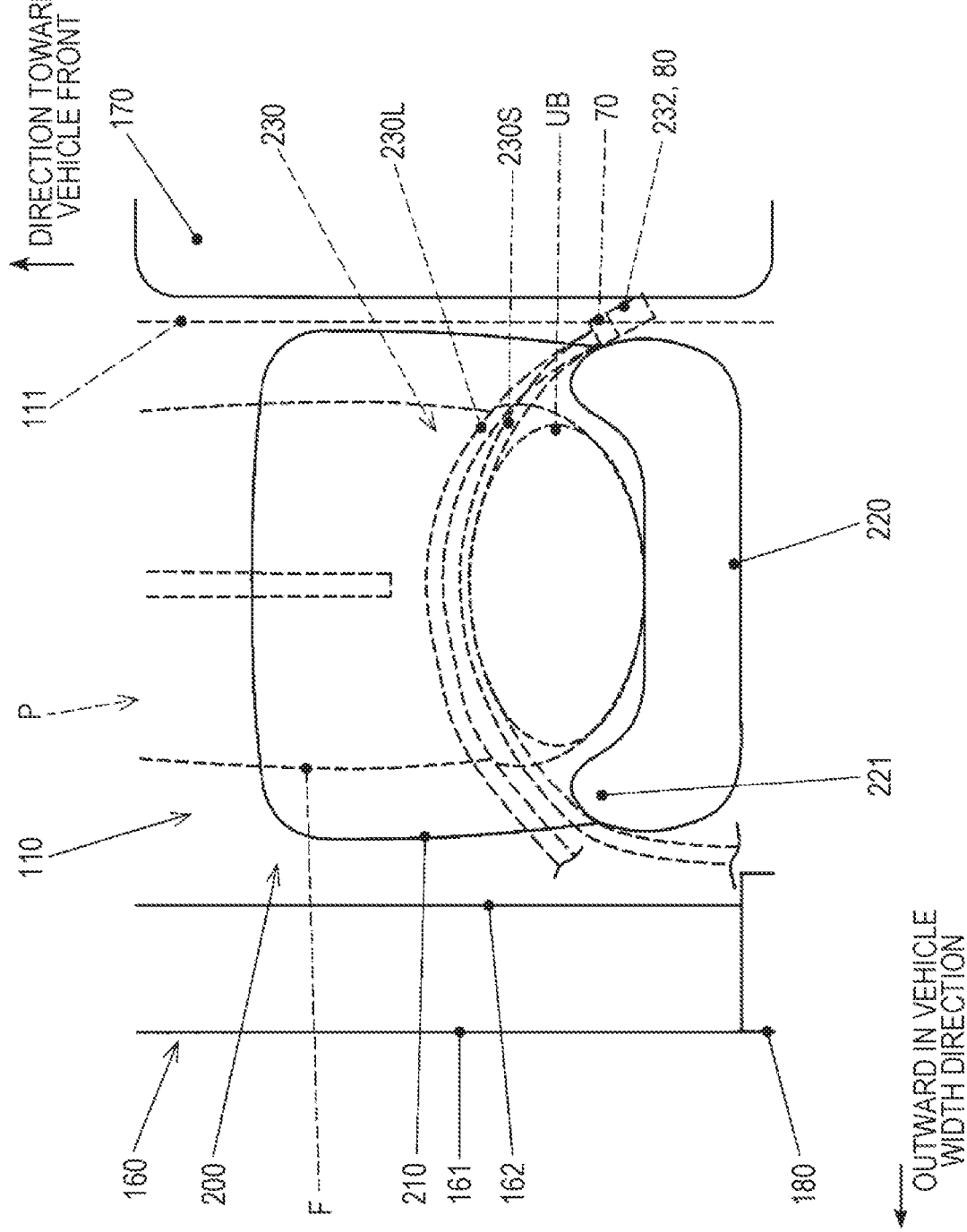
FIG. 4 is a sectional view of FIG. 2 taken along line IV-IV.

FIG. 4 is a sectional view of FIG. 2 taken along line IV-IV.

As illustrated in FIG. 1, an occupant protection device 1 includes, for example, a stereo camera system 11, a millimeter-wave radar system 12, a laser scanning system 13, an environment recognition unit 20, an occupant protection device control unit 30, an airbag control unit 40, a shoulder pretensioner 50, a lap pretensioner 60, a locking tongue 70, and a buckle pretensioner 80.

The stereo camera system 11 includes, for example, a pair of left and right cameras and a stereo-image-processing unit.

Each of the left and right cameras is an imaging device that includes, for example, an optical system such as lenses, a solid-state imaging element such as a CMOS, a driving device for the solid-state imaging element, an image processing engine, and an input-output interface.

The cameras are separated from each other in a left-right direction and face toward the vehicle front.

For example, the cameras are hung from the front edge of a roof 130 in the vehicle cabin and capture images in front of the vehicle across a windshield 140.

The stereo-image-processing unit is successively provided with data of the images that are captured by the left and right cameras.

The stereo-image-processing unit performs a known stereo image process on the data of the captured images, and calculates the position of a subject relative to the vehicle to identify the kind of the subject (for example, a vehicle, a pedestrian, a building, or a topography).

The millimeter-wave radar system 12 detects an object around the vehicle by using millimeter-wave radar, for example, in a 24 GHz band or a 79 GHz band to measure the position and speed of the detected object relative to the vehicle.

The laser scanning system 13 is a 3D LiDAR that three-dimensionally scans the position and shape of the object around the vehicle by radiating a laser beam to the vicinity of the vehicle and by using scattered light when the laser beam hits the object.

The laser scanning system 13 can detect the shape of the object, for example, in every direction of the vehicle (around 360°).

The environment recognition unit 20 recognizes the environment around the vehicle by using, for example, the result of detection of the object around the vehicle with the stereo camera system 11, the millimeter-wave radar system 12, and the laser scanning system 13.

From other vehicles, buildings, and other objects that are recognized by the stereo camera system 11, the millimeter-wave radar system 12, and the laser scanning system 13, the environment recognition unit 20 recognizes a risky object that is highly likely to collide with the vehicle on the basis of, for example, the position and speed thereof relative to the vehicle.

The environment recognition unit 20 transmits information about the risky object to the occupant protection device control unit 30 if it is determined from the position and speed (approach speed) of the risky object relative to the vehicle that a collision between the risky object and the vehicle is inevitable (if the result of a pre-crash determination is true).

Examples of the information about the risky object include the kind of the risky object, an expected collision location, the direction in which collision energy is directed, an expected time until the collision, and an expected relative speed in the collision.

The occupant protection device control unit 30 instructs and controls, for example, the airbag control unit 40, the shoulder pretensioner 50, the lap pretensioner 60, the locking tongue 70, and the buckle pretensioner 80 in response to, for example, a precursor of a head-on collision or a side collision between the vehicle and the risky object (such as another vehicle).

An accelerometer 31 is coupled to the occupant protection device control unit 30.

The accelerometer 31 includes, for example, an acceleration pickup that detects an acceleration in the front-rear direction of the vehicle body and an acceleration in the vehicle width direction.

The accelerometer 31 functions as a detector that detects that the vehicle actually collides with the risky object such as another vehicle.

The occupant protection device control unit 30 detects the collision or the precursor thereof in conjunction with, for example, the accelerometer 31, the environment recognition unit 20, the stereo camera system 11, the millimeter-wave radar system 12, and the laser scanning system 13 and functions as a side-collision detector that can detect the direction of the collision.

The function and operation of the occupant protection device control unit 30 will be described in detail later.

The airbag control unit 40 collectively controls airbag systems such as a driver's seat head-on collision airbag, a passenger seat head-on collision airbag, a knee protection airbag, a side airbag, a curtain airbag, and a seat cushion airbag.

Each airbag system restrains a part of the body of the occupant in a manner in which an inflator that emits gas for inflation is actuated in response to an instruction from the airbag control unit 40, and a bag that is composed of a base fabric panel such as nylon and that is accommodated in, for example, an interior member is inflated and deployed.

The shoulder pretensioner 50 and the lap pretensioner 60 are tensioners (seat belt pretensioners) that pull a shoulder belt 230S and a lap belt 230L of a seat belt 230, which will be described later, and apply a tensile force thereto.

The locking tongue 70 allows an intermediate part of the seat belt 230 to pass therethrough, is detachably joined to a buckle 232, and has a lock function described later.

The shoulder belt 230S of the seat belt 230 is nearer than the locking tongue 70 to a slip joint 233, and the lap belt 230L thereof is nearer than the locking tongue 70 to the lap pretensioner 60.

The buckle pretensioner 80 is a tensioner (seat belt pretensioner) that is disposed on the buckle 232 to which the locking tongue 70 is detachably joined, that pulls the locking tongue 70, for example, downward, and that simultaneously applies a tensile force to the shoulder belt 230S and the lap belt 230L.

The function of the shoulder pretensioner 50, the lap pretensioner 60, the locking tongue 70, and the buckle pretensioner 80 will be described in detail later.

As illustrated in FIG. 2, FIG. 3, and FIG. 4, a vehicle cabin 100 includes, for example, a floor 110, a toe board 120, the roof 130, the windshield 140, an instrument panel 150, a side door 160, a center console 170, and a B-pillar 180.

The vehicle cabin 100 has a space in which an occupant P, for example, is accommodated.

The floor 110 forms a floor surface of the vehicle cabin. The floor 110 extends substantially horizontally along the bottom of the vehicle cabin 100.

As illustrated in FIG. 3, the floor 110 has a floor tunnel 111.

The floor tunnel 111 extends in the front-rear direction of the vehicle and is formed in a manner in which a central part of the floor 110 in the vehicle width direction is projected upward.

For example, a transmission, a propeller shaft, and an exhaust pipe, not illustrated, are accommodated inside the floor tunnel 111 (under the floor).

For example, front side frames 112, a side sill 113, and a seat cross member 114 are joined to the floor 110.

Each of the front side frames 112 is a structural member that has a beam-like shape having a closed section and that extends in the front-rear direction of the vehicle along the lower surface of the floor tunnel 111.

The front side frames 112 are paired with each other and are disposed on the left and right-hand sides of the floor tunnel 111.

The side sill 113 is a structural member that has a beam-like shape having a closed section and that extends in the front-rear direction of the vehicle along a side edge of the floor 110.

The side sill 113 forms the lower edge of a door opening in which the side door 160 is disposed.

The seat cross member 114 is a structural member that projects from the upper surface of the floor 110 and that extends in the vehicle width direction.

Both ends of the seat cross member 114 are coupled to the floor tunnel 111 and the side sill 113.

The seat cross member 114 is a base to which a seat rail 211 that supports a seat 200 is joined.

The toe board 120 forms a lower front surface of the vehicle cabin 100.

The toe board 120 is raised upward from the front edge of the floor 110.

The toe board 120 functions as a partition between the vehicle cabin 100 and an engine room not illustrated.

The roof 130 forms the ceiling of the vehicle cabin 100. The roof 130 extends substantially horizontally along the top of the vehicle cabin 100.

As illustrated in FIG. 3, roof side frames 131 are disposed along left-hand and right-hand edges of the roof 130.

Each of the roof side frames 131 is a structural member that extends in the front-rear direction along a side edge of the roof 130.

A front end of the roof side frame 131 is joined to the upper end of an A-pillar that extends along a side edge of the windshield 140.

A roof trim 132 that is an interior member is disposed on the lower surface of the roof 130.

The windshield 140 is disposed at the front of the vehicle cabin 100 so as to be in front of the upper body UB of the occupant P.

The windshield 140 inclines toward the rear such that the upper edge is nearer than the lower edge to a vehicle rear.

The upper edge of the windshield 140 is joined to the front edge of the roof 130.

The lower edge of the windshield 140 is joined to a cowl, not illustrated, near the upper edge of the instrument panel 150.

The instrument panel 150 is an interior member on which components such as instruments, an air conditioner, a navigation device, and a glovebox are disposed.

The instrument panel 150 projects from the top of the toe board 120 toward the vehicle rear (toward the occupant P).

The side door 160 is a door member that is disposed on a side of the vehicle cabin 100 and that is used, for example, when the occupant P gets in or out.

The side door 160 includes, for example, an outer panel 161, a door trim 162, and a door glass 163.

The outer panel 161 forms a part of an outer plate of the vehicle body and is formed by pressing a metal plate such as a steel plate.

An inner panel, not illustrated, is joined to the inner surface of the outer panel 161.

The door trim 162 is an interior member that is provided as a member of the side door 160 facing the vehicle cabin 100 and is composed of, for example, a resin material.

The door glass 163 projects upward from the upper edge of the outer panel 161 and can be raised and lowered.

When the door glass 163 is closed (is raised to the highest position), the upper edge of the door glass 163 is located near the roof side frame 131.

The center console 170 is an interior member that is disposed on the top of the floor tunnel 111 in the vehicle cabin 100.

The center console 170 is composed of, for example, a resin material and has, for example, a space in which small items are accommodated.

The B-pillar 180 is a pillar member that extends from the roof side frame 131 to the side sill 113.

The B-pillar 180 extends along the rear edge of the side door 160 and includes a striker that is engaged with a latch mechanism, not illustrated, of the side door 160.

The slip joint 233, a retractor 231, and the lap pretensioner 60 of the seat belt 230 are joined to the B-pillar 180 in this order from above.

In the vehicle cabin 100, the seat 200 on which a front seat (the driver's seat or the passenger seat) occupant sits is disposed.

The seat 200 is secured to the top of the floor 110 such that the position thereof can be adjusted in the front-rear direction by using the seat rail 211.

The seat 200 includes a seat base 210 and a seat back 220, and the seat belt 230 is disposed thereon.

The seat base 210 is substantially flat, and a part of the occupant P from the thigh F to the buttocks is to be placed thereon.

The upper surface of the seat base 210 that comes into contact with the occupant P extends substantially horizontally in a normal state, and slightly inclines such that the position of the front edge is higher than that of the rear edge.

The seat base 210 is joined to the seat cross member 114 on the floor 110 with the seat rail 211 interposed therebetween.

The seat rail 211 supports the seat base 210 such that the seat base 210 can move in the front-rear direction relative to the floor 110.

The seat back 220 is a backrest that holds the back of the upper body UB of the occupant P.

The seat back 220 extends upward from the vicinity of the rear edge of the seat base 210.

The front surface of the seat back 220 that comes into contact with the occupant P slightly inclines toward the rear such that the upper edge is nearer than the lower edge to the vehicle rear.

In the seat base 210 and the seat back 220, an elastic body such as a spring is disposed in a seat frame that is composed of, for example, a metal, the seat frame is coated with an elastic body such as urethane foam, which is covered by an outer skin that is composed of, for example, a fabric such as a textile or a knitted fabric, natural leather, or synthetic leather.

As illustrated in FIG. 4, side supports 221 that project toward the vehicle front are disposed along both side edges of the seat back 220 in the left-right direction (vehicle width direction).

The side supports 221 have a function of supporting the flanks of the occupant P to prevent the upper body UB of the occupant P from being shaken in the vehicle width direction due to a centripetal acceleration during turning or an impact acceleration in a side collision.

The seat belt 230 restrains the occupant P by the webbing that is composed of cloth.

The seat belt 230 is a three-point seat belt that includes the shoulder belt 230S that is obliquely stretched on the front (chest) of the upper body UB of the occupant P and the lap belt 230L that is stretched on the waist of the occupant P in the left-right direction.

The seat belt 230 includes, for example, the retractor 231, the buckle 232, and the slip joint 233 in addition to the shoulder pretensioner 50, the lap pretensioner 60, the locking tongue 70, and the buckle pretensioner 80 described above.

The shoulder belt 230S and the lap belt 230L share a common belt (webbing). The shoulder belt 230S is nearer than the locking tongue 70 to the retractor 231, and the lap belt 230L is nearer than the locking tongue 70 to the lap pretensioner 60.

An end of the seat belt 230 is joined to the retractor 231 such that the seat belt 230 can be wound up.

The retractor 231 is joined to the B-pillar 180 at an intermediate position in the vertical direction.

The shoulder pretensioner 50 is contained in the retractor 231.

The retractor 231 pulls the seat belt 230 with a weak pulling force that is decreased to such an extent that movement of the upper body UB of the occupant P is not hindered in a normal state. The retractor 231 has an emergency locking retractor (ELR) function of locking the seat belt 230 when the seat belt 230 is drawn at a predetermined speed or more.

The locking tongue 70 through which the intermediate part of the seat belt 230 is inserted is joined to the buckle 232.

For example, the buckle 232 is joined to a seat frame, not illustrated, near the rear edge of the seat base 210 of the seat 200 and on the inner side in the vehicle width direction.

The buckle 232 includes the buckle pretensioner 80 that pulls the locking tongue 70 to apply a tensile force to the shoulder belt 230S and the lap belt 230L.

The slip joint 233 is joined to the B-pillar 180 above the retractor 231 and changes the direction of the seat belt 230 that is drawn upward from the retractor 231 into the direction toward the buckle 232.

The seat belt 230 can freely pass through the slip joint 233.

The other end of the seat belt 230 opposite the retractor 231 is coupled to the lap pretensioner 60.

The lap pretensioner 60 is joined to the vicinity of the lower end of the B-pillar 180.

The shoulder pretensioner 50, the lap pretensioner 60, and the buckle pretensioner 80 have a function of pulling the seat belt 230 to apply a tensile force thereto in response to an instruction from the occupant protection device control unit 30.

The shoulder pretensioner 50, the lap pretensioner 60, and the buckle pretensioner 80 include a gas pressure actuator to pull the seat belt 230 by using, for example, a gas pressure that is applied by an explosive gas generator.

The locking tongue 70 is detachably joined to the buckle 232 with the webbing of the seat belt 230 inserted therethrough.

A region of the webbing of the seat belt 230 that is nearer than the locking tongue 70 to the slip joint 233 functions as the shoulder belt 230S, and a region thereof that is nearer than the locking tongue 70 to the lap pretensioner 60 functions as the lap belt 230L.

In response to an instruction from the occupant protection device control unit 30, the locking tongue 70 is capable of switching between an open state (unlock state) in which the webbing is allowed to freely pass therethrough with the locking tongue 70 being between the shoulder belt 230S and the lap belt 230L and a restraint state (lock state) in which the webbing is restrained from passing therethrough.

Figure 5:
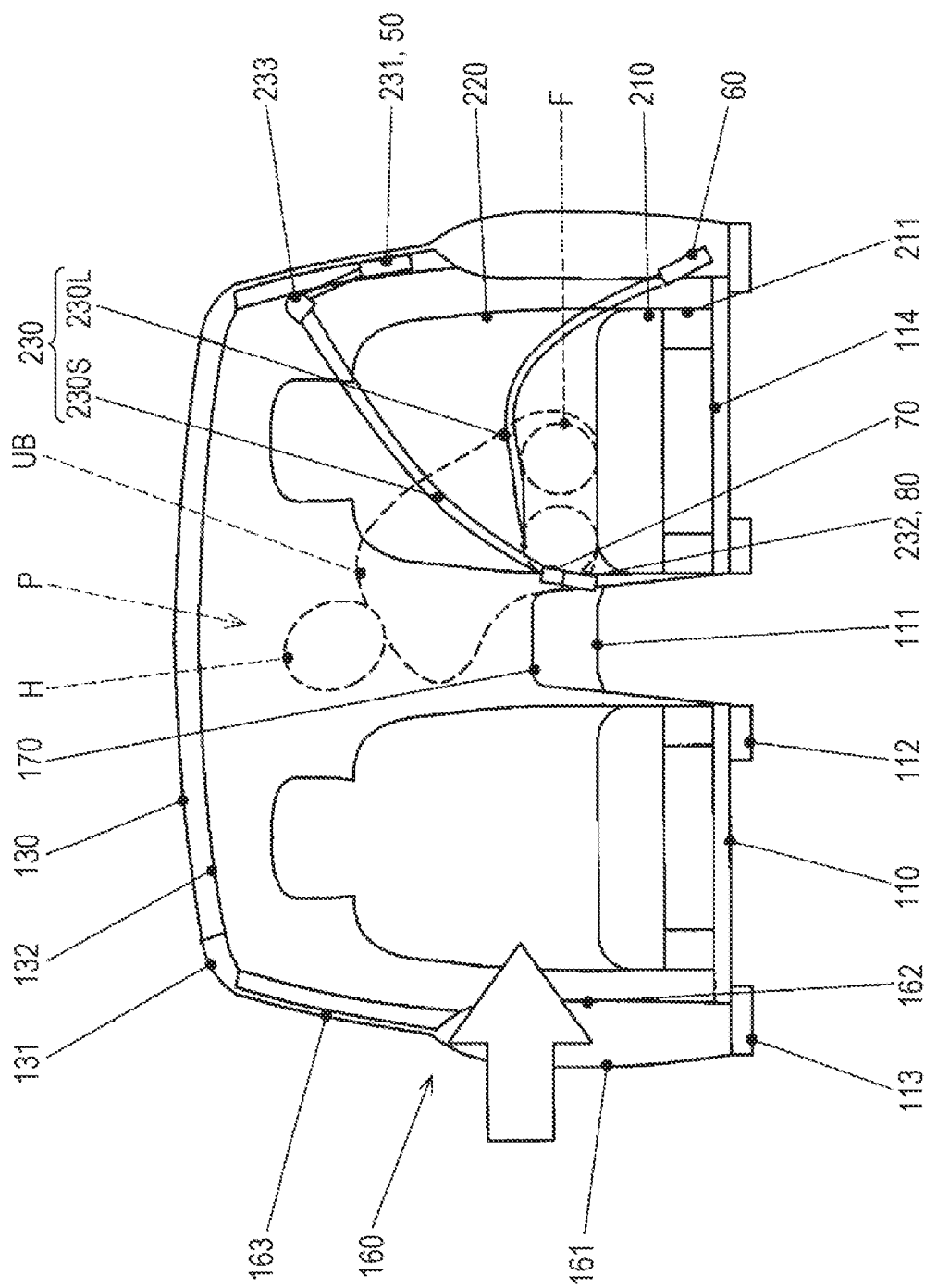
FIG. 5 schematically illustrates an example of behavior of an occupant when a far side collision of the vehicle occurs.

FIG. 5 schematically illustrates an example of behavior of the occupant when a far side collision of the vehicle occurs.

In the case where the shoulder pretensioner 50, the lap pretensioner 60, the locking tongue 70, and the buckle pretensioner 80, for example, are not controlled, as illustrated in FIG. 5, when the far side collision occurs on the right-hand side of the vehicle with the occupant P sitting on the seat 200 on the left-hand side, the vehicle body moves in the left direction due to the collision, and the occupant P moves in the right direction relative to the vehicle body due to the inertial force.

At this time, the waist of the occupant is restrained by the lap belt 230L, and movement thereof is restricted by interference with the center console 170 even when the waist moves in the vehicle width direction. Accordingly, the upper body UB is greatly shaken in the right direction (inward in the vehicle width direction).

When the upper body UB is thus greatly shaken, not only the upper body itself is injured, but also there is a concern that the occupant is injured due to a collision with an adjacent occupant or an interior member in the vehicle cabin.

In view of this, the occupant protection device according to the first embodiment protects the occupant in the side collision by control described below.

FIG. 6 is a flow chart illustrating control of the occupant protection device according to the first embodiment in a far side collision.

The steps will be described below in order.

Step S01: Determination of Far Side Collision

The occupant protection device control unit 30 determines whether a far side collision or a precursor thereof has been detected on the basis of information that is obtained from the accelerometer 31 and the environment recognition unit 20.

In the case where the far side collision or the precursor thereof has been detected, the result of the far side collision determination is true, and the flow proceeds to a step S02.

In the other case, a series of processes are finished.

Step S02: Locking of Locking Tongue and Actuation of Lap Pretensioner

The occupant protection device control unit 30 changes the state of the locking tongue 70 from the unlock state into the lock state and causes the lap pretensioner 60 to be immediately actuated.

The state of the lap pretensioner 60 is changed into a first pulling state in which the lap pretensioner 60 pulls the seat belt 230 to apply a tensile force to the lap belt 230L.

The tensile force of the lap belt 230L is set to a value that enables the waist to be inhibited from rotating and enables the buttocks to be prevented from being raised from the seat base 210 when the upper body UB of the occupant P swings about the waist inward in the vehicle width direction.

The shoulder belt 230S is locked by the ELR function of the retractor 231. At this time, however, the shoulder belt 230S is not pulled by the shoulder pretensioner 50.

Subsequently, the flow proceeds to a step S03.

Step S03: Counting-Up of Elapsed Time After Actuation of Lap Pretensioner

The occupant protection device control unit 30 adds (counts up) a counter value of a timer for timing of a time elapsed after the lap pretensioner 60 is actuated at the step S02.

Subsequently, the flow proceeds to a step S04.

Step S04: Determination Whether Predetermined Time has Elapsed

The occupant protection device control unit 30 determines whether a predetermined time has elapsed after the lap pretensioner 60 is actuated (the elapsed time exceeds a threshold).

The predetermined time (threshold) is set in consideration for a time until the upper body UB of the occupant P on the far side moves a predetermined distance or more inward in the vehicle width direction and the back is separated from the seat back 220 (see FIG. 7 described later) after the side collision of the vehicle occurs.

In the case where the elapsed time exceeds the predetermined time, the flow proceeds to a step S05. In the case where the elapsed time does not exceed the predetermined time, the flow returns to the step S03, and the subsequent processes are repeated.

Step S05: Actuation of Shoulder and Buckle Pretensioners and Unlocking of Locking Tongue The occupant protection device control unit 30 causes the shoulder pretensioner 50 and the buckle pretensioner 80 to be actuated and changes the state of the locking tongue 70 from the lock state to the unlock state.

The state of the shoulder pretensioner 50 and the buckle pretensioner 80 is changed into a second pulling state in which the shoulder pretensioner 50 pulls the shoulder belt 230S and the buckle pretensioner 80 pulls the locking tongue 70.

The change of the state of the locking tongue 70 into the unlock state results in the tensile force of the lap belt 230L being partly transmitted to the shoulder belt 230S. Consequently, the tensile force of the shoulder belt 230S is rapidly increased.

Subsequently, the series of processes are finished.

An effect obtained by rapidly increasing the tensile force of the shoulder belt 230S at the above step S05 will now be described in detail.

FIG. 7 illustrates a state of the occupant protection device according to the first embodiment right before the shoulder pretensioner is actuated.

FIG. 8 illustrates a state of the occupant protection device according to the first embodiment right after the shoulder pretensioner is actuated.

FIG. 7 and FIG. 8 illustrate the same location as in FIG. 4.

As illustrated in FIG. 7, the upper body UB of the occupant P is shaken about the waist inward in the vehicle width direction with the back separated from the seat back 220 right after the far side collision occurs.

In the case where the degree of such behavior becomes excessive, the head H of the occupant P collides with, for example, another occupant near the collision (on a near side) or an interior member, which results in injury.

In view of this, according to the first embodiment, the shoulder pretensioner 50, for example, is actuated to pull the shoulder belt 230S and increase the tensile force after the state of the upper body UB of the occupant P becomes the state illustrated in FIG. 7.

Consequently, as illustrated in FIG. 8, an outer (left-hand side in FIG. 8) shoulder part of the upper body UB in the vehicle width direction is strongly pulled toward the vehicle rear.

In addition, the back of the upper body UB is pressed against the seat back 220. Consequently, an inner region of the back in the vehicle width direction is rested on the corresponding side support 221, and an inner shoulder in the vehicle width direction moves forward relative to the outer shoulder in the vehicle width direction. The distance of the movement increases when the upper body UB slides on the seat back 220 inward in the vehicle width direction.

As a result, the upper body UB of the occupant P starts rotating about a rotation axis that extends in the vertical direction such that the outer shoulder in the vehicle width direction moves backward.

Some of kinetic energy when the upper body UB moves inward in the vehicle width direction is converted to kinetic energy in the direction of the rotation. This decreases the distance of movement of the upper body UB and the head H inward in the vehicle width direction.

According to the first embodiment described above, the following effects can be achieved.

(1) Since the lap belt 230L is pulled in the far side collision, the behavior of the waist of the occupant P is stable, and the upper body UB of the occupant P can move inward in the vehicle width direction with the back separated from the seat back 220.

Since the shoulder belt 230S is subsequently pulled in this state, the outer shoulder of the occupant P in the vehicle width direction is pulled toward the vehicle rear, and the kinetic energy of the upper body UB of the occupant P can be converted from kinetic energy that causes the upper body UB to swing and fall inward in the vehicle width direction to kinetic energy that causes the outer shoulder in the vehicle width direction to rotate about the axis that extends in the vertical direction backward (direction in which the body is twisted so as to face outward in the vehicle width direction).

As a result, the upper body UB of the occupant P can be inhibited from swinging inward in the vehicle width direction and injury of the occupant P can be reduced by decreasing the distance of movement of the head H.

In the early stage of the collision, the tensile force of the shoulder belt 230S is decreased, and the tensile force of the lap belt 230L is increased to inhibit the waist from swinging and prevent the buttocks of the occupant P from being raised from the seat base 210. Subsequently, the shoulder belt 230S is pulled with a force that enables the upper body UB to be twisted. This prevents the tensile force of the shoulder belt 230S in the early stage of the collision from being excessively increased and inhibits the upper body UB of the occupant P from swinging inward in the vehicle width direction while inhibiting the chest of the occupant P from being injured, unlike the case where the tensile force of a three-point seat belt is increased overall in the early stage of a collision to restrain the waist.

(2) Since the state of the locking tongue is changed into the unlock state during transition to the second pulling state, the tensile force of the lap belt is partly transmitted to the shoulder belt, and the tensile force of the shoulder belt can be more rapidly increased.

(3) Since the buckle pretensioner 80 is also used when the shoulder belt 230S is pulled from both sides, the tensile force of the shoulder belt 230S can be rapidly increased, and the above effects can be enhanced.

(4) Since the shoulder belt 230S starts to be pulled when the elapsed time is equal to or more than the predetermined time after the lap pretensioner 60 is actuated right after the side collision occurs, the above effects can be achieved by simple control in which the elapsed time after the side collision is used.

Second Embodiment

An occupant protection device according to a second embodiment of the disclosure will now be described.

In the description of each embodiment below, components that are substantially common to those in the embodiment thereinbefore are designated by like reference numbers, a description thereof is omitted, and differences will be mainly described.

The shoulder pretensioner 50 of the occupant protection device according to the second embodiment can perform a two-stage pulling process of a preliminary pulling process and a primary pulling process, which will be described below.

In the primary pulling process, the shoulder pretensioner 50 applies substantially the same pulling force as that when the shoulder pretensioner 50 according to the first embodiment is actuated.

In the preliminary pulling process, a pulling force that is less than that in the primary pulling process is applied.

FIG. 9 is a flow chart illustrating control of the occupant protection device according to the second embodiment in a far side collision.

The steps will be described below in order.

Step S11: Determination of Far Side Collision

The occupant protection device control unit 30 determines whether a far side collision or a precursor thereof has been detected on the basis of information that is obtained from the accelerometer 31 and the environment recognition unit 20.

In the case where the far side collision or the precursor thereof has been detected, the result of the far side collision determination is true, and the flow proceeds to a step S12.

In the other case, a series of processes are finished.

Step S12: Locking of Locking Tongue, Actuation of Lap Pretensioner, and Preliminary Pulling Process of Shoulder Pretensioner The occupant protection device control unit 30 changes the state of the locking tongue 70 from the unlock state to the lock state and causes the lap pretensioner 60 to be immediately actuated.

The state of the lap pretensioner 60 is changed into the first pulling state in which the lap pretensioner 60 pulls the seat belt 230 to apply a tensile force to the lap belt 230L.

The occupant protection device control unit 30 causes the shoulder pretensioner 50 to perform the preliminary pulling process.

Consequently, the shoulder belt 230S is pulled with a pulling force that is relatively weaker than that in the primary pulling process and subjected to a tensile force.

Subsequently, the flow proceeds to a step S13.

Step S13: Counting-Up of Elapsed Time After Actuation of Lap Pretensioner

The occupant protection device control unit 30 adds (counts up) the counter value of the timer for timing of a time elapsed after the lap pretensioner 60 is actuated at the step S12.

Subsequently, the flow proceeds to a step S14.

Step S14: Determination Whether Predetermined Time has Elapsed

The occupant protection device control unit 30 determines whether the predetermined time has elapsed after the lap pretensioner 60 is actuated (the elapsed time exceeds a threshold).

In the case where the elapsed time exceeds the predetermined time, the flow proceeds to a step S15. In the case where the elapsed time does not exceed the predetermined time, the flow returns to the step S13, and the subsequent processes are repeated.

Step S15: Primary Pulling Process of Shoulder Pretensioner, Actuation of Buckle Pretensioner, and Unlocking of Locking Tongue The occupant protection device control unit 30 causes the buckle pretensioner 80 to be actuated and changes the state of the locking tongue 70 form the lock state to the unlock state.

The occupant protection device control unit 30 changes the state of the shoulder pretensioner 50 from a preliminary pulling state to a primary pulling state in which an increased pulling force is applied.

The state of the shoulder pretensioner 50 and the buckle pretensioner 80 is changed into the second pulling state in which the shoulder pretensioner 50 relatively strongly pulls the shoulder belt 230S and the buckle pretensioner 80 relatively strongly pulls the locking tongue 70.

The change of the state of the locking tongue 70 into the unlock state results in the tensile force of the lap belt 230L being partly transmitted to the shoulder belt 230S. Consequently, the tensile force of the shoulder belt 230S is rapidly increased.

Subsequently, the series of processes are finished. According to the second embodiment described above, since the shoulder pretensioner 50 applies a relatively weak preliminary pulling force to the shoulder belt 230S in the first pulling state, the upper body UB of the occupant P can be prevented from excessively moving forward, and the posture of the occupant P can be stable during transition to the second pulling state to protect the occupant with more certainty, in addition to substantially the same effects as in the first embodiment.

Third Embodiment

An occupant protection device according to a third embodiment of the disclosure will now be described.

FIG. 10 is a block diagram illustrating the structure of the occupant protection device according to the third embodiment.

As illustrated in FIG. 10, the occupant protection device control unit 30 according to the third embodiment is connected to an occupant monitoring device 32.

The occupant monitoring device 32 includes, for example, a camera that captures an image of the occupant P and a proximity sensor that detects the behavior of the occupant P and can detect the distance of movement of the upper body UB of the occupant P when the upper body UB is shaken and swings about the waist in the vehicle width direction.

The detected distance of movement is successively transmitted to the occupant protection device control unit 30.

FIG. 11 is a flow chart illustrating control of the occupant protection device according to the third embodiment in a far side collision.

The steps will be described below in order.

Step S21: Determination of Far Side Collision

The occupant protection device control unit 30 determines whether a far side collision or a precursor thereof has been detected on the basis of information that is obtained from the accelerometer 31 and the environment recognition unit 20.

In the case where the far side collision or the precursor thereof has been detected, the result of the far side collision determination is true, and the flow proceeds to a step S22.

In the other case, a series of processes are finished.

Step S22: Locking of Locking Tongue and Actuation of Lap Pretensioner

The occupant protection device control unit 30 changes the state of the locking tongue 70 from the unlock state into the lock state and causes the lap pretensioner 60 to be immediately actuated.

The state of the lap pretensioner 60 is changed into the first pulling state in which the lap pretensioner 60 pulls the seat belt 230 to apply a tensile force to the lap belt 230L.

Subsequently, the flow proceeds to a step S23.

Step S23: Detection of Occupant Behavior

The occupant monitoring device 32 detects the behavior of the upper body UB of the occupant P, particularly, the distance of movement thereof in the vehicle width direction and successively transmits the result of detection to the occupant protection device control unit 30.

Subsequently, the flow proceeds to a step S24.

Step S24: Determination of Distance of Movement of Upper Body.

The occupant protection device control unit 30 determines whether the distance of movement of the upper body UB of the occupant P in the vehicle width direction relative to the vehicle body is equal to or more than a predetermined distance (threshold).

In the case where the distance of movement of the upper body UB is equal to or more than the predetermined distance, the flow proceeds to a step S25. In the case where the distance of movement of the upper body UB is less than the predetermined distance, the flow returns to the step S23, and the subsequent processes are repeated.

Step S25: Actuation of Shoulder and Buckle Pretensioners and Unlocking of Locking Tongue The occupant protection device control unit 30 causes the shoulder pretensioner 50 and the buckle pretensioner 80 to be actuated and changes the state of the locking tongue 70 from the lock state into the unlock state.

The state of the shoulder pretensioner 50 and the buckle pretensioner 80 is changed into the second pulling state in which the shoulder pretensioner 50 pulls the shoulder belt 230S and the buckle pretensioner 80 pulls the locking tongue 70.

The change of the state of the locking tongue 70 into the unlock state results in the tensile force of the lap belt 230L being partly transmitted to the shoulder belt 230S. Consequently, the tensile force of the shoulder belt 230S is rapidly increased.

Subsequently, the series of processes are finished.

According to the third embodiment described above, since transition to the second pulling state is brought about on the basis of the actual behavior of the upper body UB of the occupant P, the accuracy of the control is increased, and the occupant can be protected with more certainty, in addition to substantially the same effects as in the first embodiment.

Modification

The disclosure is not limited to the above embodiments. Various modifications and alterations can be made within the technical scope of the disclosure.

(1) The structure of the occupant protection device and the vehicle that is equipped with the occupant protection device are not limited to the above embodiments and can be appropriately changed.

For example, in addition to the control of the tensile force of the lap belt and the shoulder belt through the control of the pretensioners and the locking tongue, another occupant-restraining device such as an airbag may be combined and used to protect the occupant.

(2) The occupant protection device according to each embodiment is disposed, for example, on a front seat of a car.

The occupant protection device, however, is not limited thereto and can be disposed on a rear seat (a second row seat of a vehicle having plural rows).

The occupant protection device that can be provided according to each embodiment of the disclosure inhibits the occupant from moving in the vehicle width direction and inhibits the chest from being injured in a far side collision as described above.

The invention claimed is:

1. An occupant protection device comprising:
   a seat belt for an occupant in a seat that is offset in a vehicle width direction toward a first side of a vehicle body from a center of the vehicle body, the seat belt comprising 1) a shoulder belt that is configured to be stretched between a vicinity of an outer shoulder part of the occupant in the vehicle width direction and a vicinity of an inner waist part of the occupant in the vehicle width direction and 2) a lap belt that is configured to be stretched between the vicinity of the inner waist part of the occupant in the vehicle width direction and a vicinity of an outer waist part of the occupant in the vehicle width direction;
   a locking tongue through which the seat belt passes, the locking tongue being configured to be detachably joined to a buckle near the inner waist part of the occupant in the vehicle width direction, the locking tongue being configured to switch between 1) an unlock state in which the seat belt is avowed to move through the locking tongue and 2) a lock state in which movement of the seat belt through the locking tongue is restricted;
   a shoulder-belt puller that is capable of pulling the shoulder belt to apply a tensile force thereto;
   a lap-belt puller that is capable of pulling the lap belt to apply a tensile force thereto;
   a side-collision detector that is configured to detect a side collision on a second side of the vehicle body or a precursor thereof, the second side being opposite the first side of the vehicle body; and
   a control unit connected to the side-collision detector, the control unit being configured to:
      in response to the side-collision detector detecting the side collision on the second side of the vehicle body or the precursor thereof, change a state of the locking tongue into the lock state and a state of the seat belt into a first puffing state in which the lap-belt puller pulls the lap belt so that an upper body of the occupant is avowed to move inward in the vehicle width direction; and
      subsequent to the state of the seat belt being changed to the first pulling state, change a state of the seat belt into a second pulling state in which the shoulder-belt puller pulls the shoulder belt so that a body of the occupant twists so as to face outward in the vehicle width direction and an outer shoulder of the occupant in the vehicle width direction moves backward.

2. The occupant protection device according to claim 1, wherein the control unit changes the state of the locking tongue from the lock state into the unlock state during transition from the first pulling state to the second pulling state.

3. The occupant protection device according to claim 2, further comprising:
   a tongue puller that is disposed on the buckle and that pulls the locking tongue,
   wherein the tongue puller pulls the shoulder belt in the second pulling state.

4. The occupant protection device according to claim 2, wherein the control unit brings about transition from the first pulling state to the second pulling state when a predetermined time has elapsed after the side collision occurs.

5. The occupant protection device according to claim 2, further comprising:
   an occupant-behavior detector that is configured to detect behavior of the occupant,
   wherein the control unit brings about transition from the first pulling state to the second pulling state when a distance of movement of an upper body of the occupant is equal to or more than a predetermined distance.

6. The occupant protection device according to claim 1, further comprising:
   a tongue puller that is disposed on the buckle and that pulls the locking tongue,
   wherein the tongue puller pulls the shoulder belt in the second pulling state.

7. The occupant protection device according to claim 1, wherein the control unit brings about transition from the first pulling state to the second pulling state when a predetermined time has elapsed after the side collision occurs.

8. The occupant protection device according to claim 1, further comprising:
   an occupant-behavior detector that is configured to detect behavior of the occupant, wherein the control unit brings about transition from the first pulling state to the second pulling state when a distance of movement of an upper body of the occupant is equal to or more than a predetermined distance.

9. An occupant protection device comprising:
a seat belt for an occupant in a seat that is offset in a vehicle width direction toward a first side of a vehicle body from a center of the vehicle body, the seat belt comprising 1) a shoulder belt that is configured to be stretched between a vicinity of an outer shoulder part of an occupant in the vehicle width direction and a vicinity of an inner waist part of the occupant in the vehicle width direction and 2) a lap belt that is configured to be stretched between the vicinity of the inner waist part of the occupant in the vehicle width direction and a vicinity of an outer waist part of the occupant in the vehicle width direction;
a locking tongue through which the seat belt passes, the locking tongue being configured to be detachably joined to a buckle to be near the inner waist part of the occupant in the vehicle width direction, the locking tongue being configured to switch between 1) an unlock state in which the seat belt is allowed to move through the locking tongue and 2) a lock state in which movement of the seat belt through the locking tongue is restricted;
a shoulder-belt puller that is capable of pulling the shoulder belt to apply a tensile force thereto;
a lap-belt puller that is capable of pulling the lap belt to apply a tensile force thereto;
a side-collision detector that detects a side collision on a second side of the vehicle body or a precursor thereof, the second side being opposite the first side of the vehicle body; and
a control unit connected to the side-collision detector, the control unit being configured to:
in response to the side-collision detector detecting the side collision on the second side of the vehicle body or the precursor thereof, change a state of the locking tongue into the lock state and a state of the seat belt into a first pulling state in which the lap-belt puller pulls the lap belt and the shoulder-belt puller pulls the shoulder belt using a predetermined preliminary pulling force so that an upper body of the occupant is avowed to move inward in the vehicle width direction; and
subsequent to the state of the seat belt being changed to the first pulling state, change a state of the seat belt into a second pulling state in which the shoulder-belt puller pulls the shoulder belt using a pulling force that is more than the preliminary pulling force so that a body of the occupant twists so as to face outward in the vehicle width direction and an outer shoulder of the occupant in the vehicle width direction moves backward.

10. The occupant protection device according to claim 9, wherein the control unit changes the state of the locking tongue from the lock state into the unlock state during transition from the first pulling state to the second pulling state.

11. The occupant protection device according to claim 10, further comprising:
a tongue puller that is disposed on the buckle and that pulls the locking tongue,
wherein the tongue puller pulls the shoulder belt in the second pulling state.

12. The occupant protection device according to claim 10, wherein the control unit brings about transition from the first pulling state to the second pulling state when a predetermined time has elapsed after the side collision occurs.

13. The occupant protection device according to claim 10, further comprising:
an occupant-behavior detector that is configured to detect behavior of the occupant,
wherein the control unit brings about transition from the first pulling state to the second pulling state when a distance of movement of an upper body of the occupant is equal to or more than a predetermined distance.

14. The occupant protection device according to claim 9, further comprising:
a tongue puller that is disposed on the buckle and that pulls the locking tongue,
wherein the tongue puller pulls the shoulder belt in the second pulling state.

15. The occupant protection device according to claim 9, wherein the control unit brings about transition from the first pulling state to the second pulling state when a predetermined time has elapsed after the side collision occurs.

16. The occupant protection device according to claim 9, further comprising:
an occupant-behavior detector that is configured to detect behavior of the occupant,
wherein the control unit brings about transition from the first pulling state to the second pulling state when a distance of movement of an upper body of the occupant is equal to or more than a predetermined distance.

17. A method for controlling an occupant protection device, the occupant protection device comprising:
a seat belt for an occupant in a seat that is offset in a vehicle width direction toward a first side of a vehicle body from a center of the vehicle body, the seat belt including 1) a shoulder belt that extends from an outer shoulder to an inner waist of the occupant and 2) a lap belt that extends from the inner waist to an outer waist of the occupant; and
a locking tongue through which the seat belt passes, the locking tongue being configured to be detachably joined to a buckle near the inner waist part of the occupant, the method comprising:
detecting, using a side-collision detector, a side collision on a second side of a vehicle body or a precursor thereof, the second side being opposite the first side of the vehicle body;
changing 1) a state of the locking tongue from i) an unlock state in which the seat belt is allowed to move through the locking tongue to ii) a lock state in which movement of the seat belt through the locking tongue is restricted and 2) a state of the seat belt into a first pulling state in which a lap-belt puller pulls the lap belt so that an upper body of the occupant is avowed to move inward in the vehicle width direction; and
subsequent to the state of the seat belt being changed to the first pulling state, changing the state of the seat belt from the first pulling state into a second pulling state in which a shoulder-belt puller pulls the shoulder belt so that a body of the occupant twists so as to face outward in the vehicle width direction and an outer shoulder of the occupant in the vehicle width direction moves backward.

* * * * *